United States Patent Office 3,518,304
Patented June 30, 1970

---

3,518,304
FLUOROUREAS
Colin Swithenbank, Perkasie, Sheldon N. Lewis, Willow Grove, and Kenneth L. Viste, Warminster, Pa., assignors to Rohm and Haas Company, Philadelphia, Pa., a corporation of Delaware
No Drawing. Filed Oct. 17, 1967, Ser. No. 675,797
Int. Cl. B21d 3/02; C07c 127/00
U.S. Cl. 260—553
3 Claims

ABSTRACT OF THE DISCLOSURE

Compounds of the formula

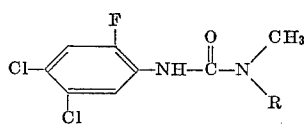

where R is H or $CH_3$ useful as pre-emergence and post-emergence herbicides.

---

This invention relates to novel biocidal compounds containing a single fluorine atom in a critical spatial position and to their use in herbicidal compositions. The herbicidal compositions are applied to the locus of an agronomic crop to effectively control the growth of weeds without causing undesirable injury to the agronomic crop, and thus effectively increase the yield of the crop. More particularly, this invention relates to the use of compositions containing herbicidally effective amounts of N-fluorochlorophenyl-N'-substituted ureas, which are pre-emergence and post-emergence herbicides, for the effective control of weed growth in agronomic crops, such as corn, oats, peanuts, rice, snap-beans, sorghum, squash, sudangrass, watermelon and wheat.

Heretofore substituted ureas have been used for a variety of end uses, such as flameproofing, weed-killing and electroplating. Generally, the prior art has disclosed the use of N-dihalophenyl N'-alkyl substituted ureas for killing or preventing the growth of weeds, or undesirable plant growth. For example, U.S. Pats. 2,655,444 and 2,645,446 disclose the use of substituted ureas for the control of weed growth. The art teaches that the preferred halogen substituent on the phenyl group is chlorine. The use of these N-di- and trichlorophenyl N'-alkyl substituted ureas for the control of weeds entails certain disadvantages. A significant disadvantage is that an effective weed controlling amount of these compounds causes injury to certain crops, such as corn and sorghum.

It is an object of this invention to provide a fluorine-containing substituted urea that is just as effective as the prior art substituted ureas in the control of undesirable plant growth, yet does not harm certain agronomic crops that are injured by the prior art compounds.

The compounds of this invention are represented by the formula

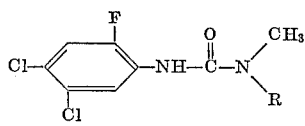

where R is H or $CH_3$. They are pre-emergence and post-emergence herbicides useful for the control of monocotyledonous plants, such as grassy-type weeds and dicotyledonous plants, such as broadleaf weeds. A more detailed discussion of the species of controllable grassy and broadleaf-type weeds will be given hereinbelow. The most significant characteristic of the compounds of this invention is that they can be used for the selective pre- and post-emergence control of weeds without causing undesirable injury to certain agronomic crops, such as listed hereinabove. The preparation of the compounds of this invention, herbicidal formulations containing them and the manner of using them will be discussed more fully hereinbelow.

A general method for the preparation of the compounds of this invention comprises reacting an isocyanate having the formula

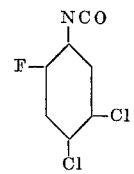

with an alkylamine, such as a dialkylamine. This isocyanate-amine reaction is readily carried out in the presence of an inert solvent, such as toluene, anisole, benzene, or dioxane. The reaction may be carried out at room temperature and without a catalyst; however it has been found convenient to gradually add a solvent solution of the amine to the isocyanate while maintaining the reaction mixture below 10° C.

The starting material 2-fluoro-4,5-dichlorophenyl isocyanate can be prepared by reacting 2-fluoro-4,5-dichloroaniline and phosgene in a hydrocarbon reaction medium, such as toluene or xylene. The phosgenation reaction can be carried out at room temperature. It has been found that trimerization of the isocyanate is avoided when pyridine is used as base in the condensation reaction between the aniline and phosgene. 2-fluoro-4,5-dichloroaniline can be produced by a number of alternative methods; see Finger et al., J. Amer. Chem. Soc., 81, 94 (1960). For example, the Schiemann reaction may be used to produce the 2-fluoro-dichloroaniline from dichloroaniline. Alternatively, the fluorine atom may be introduced into the aromatic nucleus by the displacement of halide atom from a nitrohalobenzene. Additional alternatives are available for the conversion of the amine to the urea. For example, instead of phosgenating the aniline it can be reacted with methyl isocyanate to produce the monomethyl urea, and this can be further methylated to the dimethyl urea. The reaction sequence of first reacting 2-fluoro-4,5-dichloroaniline with phosgene to form the corresponding isocyanate and then reacting the thus formed isocyanate with an alkylamine to form the substituted urea is represented by the following reaction scheme:

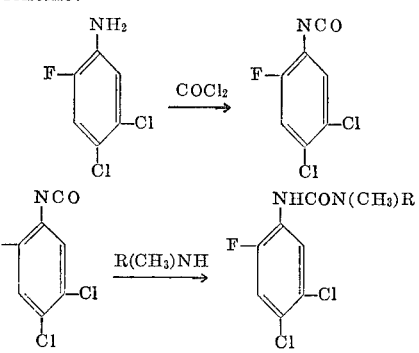

The compounds of this invention are white crystalline solids. They are only slightly soluble in water and cold benzene and, in general, appreciably soluble in dioxane, acetone, ethyl acetate, ethanol and hot benzene.

To assist those skilled in the art to practice the present invention, the following procedures are suggested by way of illustration, parts and percentages being by weight unless otherwise specifically noted.

(1) N-2-fluoro-4,5-dichlorophenyl-N',N'-dimethyl urea

To 2,374 g. (3.0 moles) of a 12.5 percent solution of phosgene in benzene is added dropwise with stirring in a suitable vessel a solution of 476 g. (2.6 moles) 2-fluoro-4,5-dichloraniline in about 412 g. (5.2 moles) pyridine. The reaction is carried out at room temperature and produces pyridine hydrochloride which is filtered off. A stream of nitrogen is passed through the reaction mixture to remove excess phosgene. To the reaction solution is added dropwise over a period of about 2 hours a solution of 140 g. (3.1 moles) of dimethylamine in 300 ml. of benzene. During this latter addition the temperature of the reaction mixture is maintained below 10° C. The substituted urea reaction product is precipitated from the reaction mixture and filtered off. The dimethylamine hydrochloride impurity is removed from the reaction product by solution in chloroform and washing with water. The chloroform solution is dried and stripped of solvent to provide about 308.5 g. N-2-fluoro-4,5-dichlorophenyl-N',N'-dimethyl urea (47.5%) having a melting point of 110–111° C.

*Analysis.*—Calc'd for $C_9H_9Cl_2FN_2O$ (percent): C, 43.05; H, 3.61; Cl, 28.25; F, 7.56; N, 11.15. Found (percent): C, 43.04; H, 3.66; Cl, 28.01; F, 7.64; N, 11.13.

(2) N-2-fluoro-4,5-dichlorophenyl-N'-methyl urea

To a solution of 8 g. 2-fluoro-4,5-dichloroaniline in 100 cc. benzene is added slowly at room temperature a solution of 2.5 g. methyl isocyanate dissolved in 100 mls. of benzene. The mixture is heated under reflux for about 1 hour and allowed to cool to room temperature. The reaction product is filtered and dried to provide 6.65 g. N-2-fluoro-4,5-dichlorophenyl-N'-methyl urea having a melting point of 207–209° C.

*Analysis.*—Calc'd for $C_8H_7Cl_2FN_2O$ (percent): C, 40.5; H, 2.97; Cl, 29.95; F, 8.15; N, 11.81. Found (percent): C, 40.57; H, 3.08; Cl, 28.92; F, 8.21; N, 11.75.

The substituted ureas prepared in procedures (1) and (2) above exhibit a broad spectrum of herbicidal activity which makes them useful wherever general weed control is required. As pointed out hereinabove these compounds exert their action against both grassy and broadleaf-type weeds. It is particularly significant that the compounds of this invention exhibit selective herbicidal action in crops and can be used to control weeds growing in corn, oats, peanuts, rice, snap-beans, sorghum, squash, sudangrass, watermelon and wheat without injuring the crop.

The precise amounts of the compounds of this invention used in any given situation will vary according to the particular end result desired, the plant and soil involved, the formulation used, the mode of application, prevailing weather conditions, foilage density and like factors. Therefore a prescribed rate of application suitable for all situations is not possible. Generally the desired herbicidal action would be achieved in the range of 0.5 to 20 lbs. per acre.

Evaluation tests

The compounds of this invention were evaluated in the greenhouse and in the field and compared with a commercially available herbicide, N-4,5-dichlorophenyl-N',N'-dimethylurea (divron) hereinafter represented as "Control," in pre-emergence and post-emergence activity tests. In the pre-emergence tests, the plants were treated with the herbicidal formulations on the same day they were planted. In the post-emergence tests, the plants were treated with the herbicidal formulations two weeks after planting.

In the greenhouse, pre-emergence tests were conducted on both grassy and broadleaf-type weeds. Certain crops were also included in the tests. The monocotyledonous species tested were barnyardgrass, foxtail, millet, rice, ryegrass, sudangrass, wheat and wild oats. The dicotyledonous species tested were curly dock, flax, lambsquarters, mustard, pigweed, soybean, tomato, velvetleaf, and wild carrot. The plants and seeds were placed in about three inches of suitable soil in separate metal flats. The flats were placed on an endless belt and moved at a constant rate under a spray nozzle. The overhead spray apparatus applied the herbicidal formulation to the areas to be treated at a carrier volume application rate of about 50 gallons per acre. The rate of herbicidal compounds applied was determined by adjusting the amounts of composition and volume. After the plants were treated they were moved to a greenhouse where they were maintained at about 75° F. for two weeks. After the two week period in the controlled environment the plants were inspected to determine the degree of growth control for the various herbicidal formulations. Each herbicidal formulation was rated on a 0 to 10 scale where 0 indicated no effect and 10 indicated complete kill. The results of the tests were then converted to percent kill. The following Table I gives the pre-emergence results for each species tested at an application rate of 1 pound of active compound per acre. In Table I, "Monocot" represents monocotyledonous species, "Dicot" represents dicotyledonous species, "F–D" represents N-2-fluoro-4,5-dichlorophenyl-N',N'-dimethylurea and "Control" is defined above.

TABLE I.—PERCENT KILL

| Test species | Control | F-D |
|---|---|---|
| Monocot: | | |
| Foxtail | 30 | 50 |
| Millet | 60 | 70 |
| Wheat | 0 | 0 |
| Ryegrass | 10 | 20 |
| Wildoats | 0 | 0 |
| Sudangrass | 0 | 0 |
| Barnyardgrass | 20 | 30 |
| Rice | 0 | 0 |
| Dicot: | | |
| Mustard | 0 | 10 |
| Wildcarrot | 30 | 60 |
| Lambsquarters | 40 | 40 |
| Curly Dock | 60 | 100 |
| Velvetleaf | 20 | 60 |
| Pigweed | 60 | 70 |
| Soybean | 0 | 0 |
| Flax | 0 | 40 |
| Ladino Clover | 0 | 70 |
| Tomato | 20 | 50 |

Evaluation tests were carried out in the same manner as described for the tests associated with Table I, except N-2-fluoro-4,5 - dichlorophenyl - N',N'-dimethylurea, represented by "F–D", was compared against N-2,4,5-trichlorophenyl-N',N'-dimethylurea, represented hereinafter as "C–D." The following Table II gives the pre-emergence results for each species tested at an application rate of 4 lbs. active compound per acre.

TABLE II.—PERCENT KILL

| Test species | F-D | C-D |
|---|---|---|
| Monocot: | | |
| Foxtail | 90 | 0 |
| Millet | 100 | 0 |
| Wheat | 0 | 0 |
| Ryegrass | 30 | 0 |
| Wildoats | 30 | 0 |
| Sudangrass | 0 | 0 |
| Barnyardgrass | 50 | 0 |
| Rice | 0 | 0 |
| Dicot: | | |
| Mustard | 20 | 0 |
| Wildcarrot | 50 | 0 |
| Lambsquarters | 70 | 70 |
| Curly Dock | 100 | 90 |
| Velvetleaf | 40 | 0 |
| Pigweed | 90 | 90 |
| Soybean | 0 | 0 |
| Flax | 60 | 0 |
| Ladino Clover | 100 | 0 |
| Tomato | 90 | 0 |

Water-dispersinble powders of the fluoro-substituted ureas of this invention were prepared. These powdered compositions were adapted for dispersing in water for application as a spray for the control of weed growth. A commercial herbicide designated hereinabove as the "Control," viz. N-4,5-dichlorophenyl - N',N' - dimethyl urea, in the form of a wettable powder was also tested to determine whether there were any differences in selectivity between it and the compounds of this invention.

The powdered compositions were made by intimately mixing the ingredients listed below using conventional blending eqeuipment and then grinding the mixture to give a powder having an average particle size less than about 50 microns.

Wettable powder formulation

| | Weight percent |
|---|---|
| Substituted-urea | 75.00 |
| Fuller's earth | 23.75 |
| Sodium lauryl sulfate, 50% (wetting agent) | 1.00 |
| Methyl cellulose, 15 cps. (dispersing agent) | 0.25 |
| | 100.00 |

Post-emergence tests were conducted in the field with the wettable powders described above to determine activity and selectivity differences between the compounds of this invention and the commercial herbicide. The wettable powder formulations were sprayed across the rows of the crops treated. The cross-spraying technique is a more severe test than a directed spray application in which more care is used to avoid direct contact with the crop. The injury to the crops was observed two weeks after planting. The crops that were more tolerant to the substituted-ureas of this invention having a single fluorine substituent in the ortho-position on the phenyl group, than to the commercial herbicide used as a control were corn, sorghum, wheat, and rice. Cotton and barley were more tolerant to the commercial herbicide. Table III gives the percent kill for each crop at the designated rate of application in pounds per acre. In the table, the commercial herbicide is represented by "Control," "F–D" represents N-2-fluoro - 4,5 - dichlorophenyl-N'-N'-dimethyl urea and "F–M" represents N-2-fluoro-4,5-dichlorophenyl-N'-methyl urea.

TABLE III.—PERCENT KILL

| Crop | Control | | F-D | | F-M |
|---|---|---|---|---|---|
| | ½ lb./a. | 1 lb./a. | ½ lb./a. | 1 lb./a. | 1 lb./a. |
| Corn | 80 | 60 | 0 | 10 | 0 |
| Sorghum | 90 | 100 | 0 | 10 | 30 |
| Cotton | 55 | 80 | 95 | 100 | 80 |
| Barley | 10 | 30 | 20 | 80 | 10 |

It can be seen from Table III that corn and sorghum are tolerant to the compounds of this invention, "F–D" and "F–M," while they are severely injured by the "Control."

Field tests were conducted to determine the effetiveness of the compounds of this invention for pre-emergence control of weeds. A series of test areas each four feet square were sprayed with formulations containing, as active ingredients, the compounds of this invention, "F–D" and "F–M," and the commercial herbicide, referred to hereinabove as the "Control." The active ingredients were applied at a rate of 1 lb. per acre. The weeds sought to be controlled were pigweed, smartweed, lambsquarters, galinsoga, purslane, crabgrass, foxtail and barnyardgrass. The initial effectiveness of the weed control was observed five weeks after planting and treatment. The compounds tested were about equal in their initial weed control capabilities. All of the weeds that had grown in this five week period were pulled and completely removed from the test section. The residual weed control effectiveness of the test compounds was measured by counting the number of weeds that reinfested the same treated test area during the sixth and seventh weeks after planting and treatment. The percent residual weed control was determined by comparing the number of weeds that reinfested an untreated test section in the period during the sixth and seventh weeks after planting against the number of weeds that developed in a treated test section during the same two week residual growth test period. The results of the tests are given in Table IV. In the table, the "control," "F–D" and "F–M" are the same as in Table III above.

TABLE IV

| Active ingredient: | Percent residual control |
|---|---|
| Untreated | 0 |
| Control | 53 |
| F–D | 79 |
| F–M | 58 |

It can be seen from Table IV that the fluoro-substituted ureas of this invention exhibited a higher residual activity than the commercial herbicide.

The herbicidal fluoro-substituted ureas of this invention can be applied to plants or other area to be protected by contacting such area with a formulation that is suitable for dissemination as a herbicide. The compounds of this invention may be formulated as finely divided wettable powders, dust and granular materials, solutions, concentrates, emulsifiable concentrates, slurries, and the like, depending upon the particular location intended and the formation media desired. In such usage, the compounds are modified with one or a plurality of additaments or adjuvants including water, organic solvents, petroleum oils, petroleum distillates, naphthas, or other liquid carriers, polymeric thickening agents, urea, surface-active dispersing agents and finely divided inert solids. When liquid formulations are employed or dry materials perpared which are to be used in liquid form, it is desirable, in certain instances, additionally to employ a wetting, emulsifying or dispersing agent to facilitate use of the formulation. Suitable surfactants are disclosed by J. W. McCutcheon in Soap and Chemical Specialties, vol. 31, Nos. 7 to 10 (1955).

In the preparation of dust compositions, the compounds of this invention can be mixed with any of the finely divided solids, such as pyrophyllite, talc, chalk, gypsum, and the like. In such operations, the finely divided carrier is ground or mixed with the substituted urea or wet with a solution of the toxicant in a volatile organic solvent. Similarly, dust compositions containing the products of this invention can be compounded with various solid surface-acting dispersing agents, such as fuller's earth, bentonite, attapulgite and other clays. Such dust compositions when employed as concentrates can be dispersed in water, with or without the aid of dispersing agents to form spray mixtures.

Further, spray compositions can be prepared by incorporating the compounds of this invention or their liquid or dust concentrate compositions in intimate mixtures with surface-active dispersing agents, such as an ionic or non-ionic emulsifying agents. Such compositions are readily employed for the control of weeds, or are disposed in liquid carriers to form diluted sprays containing the toxicants in any desired amount. The choice of dispersing agents and amounts thereof employed are determined by the ability of the agents to facilitate the dispersion of the concentrate in the liquid carrier to produce the desired spray compositions.

Similarly, the toxicant products can be compounded with a suitable water-immiscible organic liquid and a surface-active dispersing agent to produce an emulsifiable concentrate which can be further diluted with water and oil to form spray mixtures in the form of oil-in-water emulsions. In such compositions, the carrier comprises an aqueous emulsion, i.e., a mixture of water immiscible solvent, emulsifying agent and water. Preferred dispersing agents which can be employed in these compositions are oil-soluble and include the non-ionic emulsifiers, such as polyoxyethylene derivatives of sorbitan esters, complex ether alcohols and the like. Also, oil-soluble ionic emulsifying agents, such as mahogany soaps can be used. Suitable organic liquids which can be employed in the composition include petroleum oils and distillates, toluene, liquid halohydrocarbon and synthetic organic oils.

The surface-active dispersing agents are usually employed in liquid compositions in the amount of from 0.1 to 20 percent by weight of the combined weight of the dispersing agent and active compound.

In addition, other liquid compositions containing the desired amount of fluoro-substituted urea can be prepared by dissolving the toxicant in an organic liquid, such as acetone, dioxane, dimethylsulfoxide, methylene chloride, chlorobenzene and petroleum distillates. The preferred organic solvent carriers are those which are adapted to accomplish the penetration and impregnation of the soil, seed or undesirable plant with the toxicant compounds and are of such volatility as to leave little permanent residue thereon. Particularly desirable carriers are the petroleum distillates boiling almost entirely under 400° F. at atmospheric pressure and having a flash point above 80° F.

In further embodiments, the fluoro-substituted ureas of this invention or compositions containing them can be advantageously employed in combination with one or more herbicides. In such embodiments the combination can be so arranged as to give, if possible, a predetermined level of activity and selectivity. Suitable selections from the known herbicides may be combined with the fluoro-substituted ureas of this invention, such as 2,4-dichlorophenyl p-nitrophenyl ether;
2,4,6-trichlorophenyl p-nitrophenyl ether;
3-methylphenyl p-nitrophenyl ether;
3,5-dimethylphenyl p-nitrophenyl ether;
2,4-dinitrophenyl 4-trifluoromethylphenyl ether;
3,4-dichloropropionanilide;
N-(1,1-dimethyl-2-propynyl)-3,5-dichlorobenzamide;
2'-tert-butyl-2-chloro-6'-ethyl-N-hydroxymethyl-acetanilide;
2'-tert-butyl-2-chloro-N-methoxymethyl-6'-methylacetanilide;
2-bromo-2'-tert-butyl-N-methoxymethyl-6'-methylacetanilide;
2'-tert-butyl-2-iodo-N-methoxymethyl-6'-methylacetanilide;
N-butoxymethyl-2'-tert-butyl-2-chloro-6'-methylacetanilide;
3-(3-,4-dichlorophenyl)-1,1-dimethylurea;
3-(4-chlorophenyl)-1,1-dimethylurea;
3-phenyl-1,1-dimethylurea;
3-(3,4-dichlorophenyl)-3-methoxy-1,1-dimethyl-urea;
3-(4-chlorophenyl)-3-methoxy-1,1-dimethylurea;
3-(3,4-dichlorophenyl)-1-n-butyl-1-methylurea;
3-(3,4-dichlorophenyl)-1-methoxy-1-methylurea;
3(4-chlorophenyl)-1-methoxy-1-methylurea;
3-(3,4-dichlorophenyl)-1,1,3-trimethylurea;
3-(3,4-dichlorophenyl)-1,1-diethylurea;
3-(p-chlorophenoxyphenyl)-1,1-dimethylurea;
2-chloro-4,6-bis(ethylamino)-s-triazine;
2-chloro-4-ethylamino-6-iso-propylamino-s-triazine;
2-chloro-4,6-bis(methoxypropylamino)-s-triazine;
2-methoxy-4,6-bis(isopropylamino)-s-triazine;
2-diethyl-amino-4-isopropylacetamido-6-methoxy-s-triazine;
2-isopropylamino-4-methoxyethylamino-6-methylmercapto-s-triazine;
2-methylmercapto-4,6-bis(isopropylamino)-s-triazine;
2-methylmercapto-4,6-bis(ethylamino)-s-triazine;
2-methylmercapto-4-ethylamino-6-isopropylamino-s-triazine;
2-methoxy-4,6-bis(ethylamino)-s-triazine;
2-methoxy-4-ethylamino-6-isopropylamino-s-triazine;
2-chloro-4,6-bis(isopropylamino)-s-triazine;

dinitro-o-sec.-butylphenol and its salts; pentachlorophenol and its salts; 2,3,6-trichlorobenzoic acid and its salts; 2,3,5,6-tetrachlorobenzoic acid and its salts; 2-methoxy-3,5,6-trichlorobenzoic acid and its salts; 2-methoxy-3,6-dichlorobenzoic acid and its salts; 3-amino-2,5-dichlorobenzoic acid and its salts; 3-nitro-2,5-dichlorobenzoic acid and its salts; 2-methyl-3,6-dichlorobenzoic acid and its salts; 2,4-dichlorophenoxyacetic acid and its salts and esters; 2,4,5-trichlorophenoxyacetic acid and its salts and esters; (2-methyl-4-chlorophenoxy)acetic acid and its salts and esters; 2-(2,4,5-trichlorophenoxy) propionic acid and its salts and esters; 2-(2,4,5-trichlorophenoxy)ethyl-2,2-dichloro-propionate; 4-(2,4-dichlorophenoxy)butyric acid and its salts and esters; 4-(2-methyl-4-chlorophenoxy) butyric acid and its salts and esters; 2,3,6-trichlorobenzyloxypropanol; 2,6-dichlorobenzonitrile; trichloroacetic acid and its salts; 2,2-dichloropropionic acid and its salts; N,N-di(n-propyl)thiolcarbamic acid, ethyl ester; N,N-di-(n-propyl)thiolcarbamic acid, n-propyl ester; N-ethyl-N-(n-butyl) thiolcarbamic acid, ethyl ester; N-ethyl-N-(n-butyl)thiolcarbamic acid, n-propyl ester; N-phenylcarbamic acid, isopropyl ester; N-(m-chlorophenyl)carbamic acid; isopropyl ester; N-(m-chlorophenyl) carbamic acid, 4-chloro-2-butynyl ester; 2,3,6-trichlorophenylacetic acid and its salts;

2-chloro-N-N-diallylacetamide;
5,6-dihydro-(4A,6A)-dipyrido-(1,2-A,2',1'-C) pyrazinium dibromide;
3-amino-1,2,4-triazole;
3,6-endoxohexahydrophthalic acid;
hexachloroacetone;
diphenylacetonitrile;
N,N-dimethyl-α,α-diphenylacetamide;
N,N-di-n-propyl-2,6-dinitro-4-trifluoromethylaniline;
N,N-di-n-propyl-2,6-dinitro-4-methylaniline;
0-(2,4-dichlorophenyl)-0-methylisopropyl-phosphoramidothiate;
2,3,5,6-tetrachloroterephthalic acid, dimethyl ester;
3-cyclohexyl-6-methyluracil;
3-cyclohexyl-6-ethyluracil;
3-cyclohexyl-6-sec.-butyluracil;
3-norbornyl-6-methyluracil;
3-cyclopentyl-6-methyluracil;
3-cyclohexyl-6-isopropyluracil;
3-cyclohexyl-5,6-trimethyleneuracil;
3-sec.-butyl-5,6-trimethyleneuracil;
3-isopropyl-5,6-trimethyleneuracil;
3-isopropyl-5,6-tetramethyleneuracil;
3-isopropyl-5,6-pentamethylene-uracil;
3-cyclohexyl-5-bromouracil;
3-cyclohexyl-5-chlorouracil;
3-isopropyl-5-bromouracil;
3-sec.-butyl-5-bromouracil;
3-sec.-butyl-5-chlorouracil;
3-isopropyl-1-trichloromethylthio-5-bromo-6-methyluracil;
3-cyclohexyl-1-trichloromethylthio-5-bromo-6-methyluracil;
3-sec.-butyl-1-acetyl-5-bromo-6-methyluracil;
3-isopropyl-1-acetyl-5-bromo-6-methyluracil;
3-isopropyl-1-trichloromethylthio-5-chloro-6-methyluracil.

The fluoro-substituted ureas of this invention can be applied by a low-volume technique. For example, a herbicidal formulation consisting of N-2-fluoro-4,5-dichlorophenyl N',N-dimethyl uera, a suitable biocidal oil such as described hereinabove, and a suitable solvent, such as described above, may be applied neat, or without dilution with water, so that the total carrier volume per acre is less than one gallon per acre. This low-volume mixture can be applied to a locus to be protected at a rate of from about 0.1 to about 3.0 gallons per acre. The low-volume method of application is effective even when the plants in the locus to be protected from weeds are in a tender state.

It is to be understood that changes and variations may be made without departing from the spirit and scope of the invention as defined by the appended claims.

What is claimed is:
1. A compound of the formula
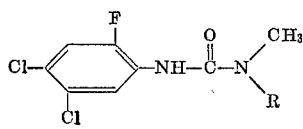
where R is H or CH$_3$.
2. A compound as defined in claim 1 where R is CH$_3$.
3. A compound as defined in claim 1 where R is hydrogen.
References Cited
UNITED STATES PATENTS
3,385,692  5/1968  Knowles _____ 260—553
2,655,446  10/1953  Todd _____ 260—553
LEON ZITVER, Primary Examiner
M. W. GLYNN, Assistant Examiner
U.S. Cl. X.R.
71—120